(12) United States Patent
Gau et al.

(10) Patent No.: US 7,964,663 B2
(45) Date of Patent: Jun. 21, 2011

(54) CRACK-RESISTANT, FLAME RETARDANT, HALOGEN-FREE, CABLE ASSEMBLY AND COATING COMPOSITION

(75) Inventors: Yimsan Gau, Belle Mead, NJ (US); Manuel F. Alsina, Dayton, NJ (US); Paul D. Whaley, Decatur, IL (US); Shana P. Bunker, Midland, MI (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 11 days.

(21) Appl. No.: 12/559,796

(22) Filed: Sep. 15, 2009

(65) Prior Publication Data

US 2010/0069545 A1 Mar. 18, 2010

Related U.S. Application Data

(60) Provisional application No. 61/097,260, filed on Sep. 16, 2008.

(51) Int. Cl.
*C08L 33/00* (2006.01)
*C08K 5/24* (2006.01)

(52) U.S. Cl. ........................................ 524/522; 524/261
(58) Field of Classification Search .................... 524/522
See application file for complete search history.

(56) References Cited

U.S. PATENT DOCUMENTS

| 4,255,303 | A |   | 3/1981 | Keogh |
|---|---|---|---|---|
| 4,317,765 | A |   | 3/1982 | Gaylord |
| 5,889,087 | A | * | 3/1999 | Hayashi et al. ............... 523/173 |
| 6,096,816 | A |   | 8/2000 | Kuckro |
| 2010/0101822 | A1 | * | 4/2010 | Bunker et al. .......... 174/110 SR |

FOREIGN PATENT DOCUMENTS

| WO | 99/24242 A1 | 5/1999 |
|---|---|---|
| WO | 2005/023924 A1 | 3/2005 |
| WO | 2007/049090 A1 | 5/2007 |

* cited by examiner

*Primary Examiner* — Ling-Siu Choi
*Assistant Examiner* — Hui Chin
(74) *Attorney, Agent, or Firm* — Whyte Hirschboeck Dudek SC

(57) ABSTRACT

Halogen-free, flame-retardant, crack-resistant, cable coatings are prepared from a composition comprising:
  A) 3 to 10 percent by weight of a low-melting temperature and medium to high grafted level maleic anhydride grafted polyethylene using a VLDPE base resin having density ranging from 0.86 to 0.91 g/cm$^3$ and made with a single-site catalyst;
  B) 15 to 25% by weight of at least one EEA or EVA;
  C) 5 to 20% by weight of an α-olefin polymer; and
  D) 40 to 65% by weight of a flame retardant inorganic filler.

10 Claims, 1 Drawing Sheet

Cracked and Non-Cracked Jackets

CRACK-RESISTANT, FLAME RETARDANT, HALOGEN-FREE, CABLE ASSEMBLY AND COATING COMPOSITION

CROSS-REFERENCE TO RELATED APPLICATION

The present application claims priority to U.S. patent application Ser. No. 61/097,260 filed on Sep. 16, 2008, the entire content of which is incorporated by reference herein.

This invention relates to crack-resistant or reduced cracking, reduced or low smoke, non-halogen or zero halogen-containing compounds and methods of their use. The invention is particularly applicable to what are referred to as low smoke, zero halogen polymers, specifically polyolefin compositions, that are used e.g., as insulation or jacketing materials for wire cable, (especially "armored" cable) and communications media. Electrical and non-electrical applications are included.

Fire resistant compositions are widely used for wire and cable jacket and insulation, among many other uses. In electrical environments, both electrical insulating and flame resistant properties are essential. That is, the compositions when ignited should not exhibit after glow, should not emit noxious or toxic smoke and should have low smoke emission. Additionally, the compositions desirably should maintain their physical properties and not deteriorate e.g., crack, over long service times.

Historically, extrudable, fire resistant compositions were made of halogenated polymers such as chlorinated polyethylene, chlorosulfonated polyethylene, polyvinyl chloride, and cholorobutadiene, or coatings of chlorinated polymers over other polymer compositions. It was found, however, in fire situations, that such chlorinated compositions produced toxic hydrogen chloride gas and emitted large quantities of noxious smoke. As smoke inhalation is an even greater cause of death in fires than the fire itself, such products were deemed to be unsuitable. Thus, non-halogen or halogen-free, crack-resistant compositions are a desideratum of the wire and cable coatings industry (among many others).

Heat aging/thermal stress cracking is a critical performance requirement for many wire and cable manufacturers worldwide. A difficult cable construction for resistance to thermal stress cracking is a cable core that is "armored" with zinc-plated steel wires. These cables are evaluated using the British Standard (BS) 6724, in which a section of cable is heat aged at 100° C. for seven days and observed for cracks. In addition, some manufacturers conduct a heat shock test in accordance with British Standard (BS) 60811-3-1. This test evaluates cracking propensity of the cable jacketing as a result of heat aging at 150° C. for 1 hour. Other properties such as extrudability, mechanical properties, flexibility and low temperature performance need to be properly controlled by controlling the composition of the low smoke zero halogen compounds which normally contain a high level of inorganic fillers which in many instances can negatively affect such properties.

BRIEF SUMMARY OF THE INVENTION

Briefly, in one aspect, the present invention is a method of increasing crack resistance or decreasing cracking propensity of low smoke, non-halogen compounds by incorporation of a maleic anhydride (MAH)-grafted coupling agent made from reaction of MAH with an ethylene-alpha-olefin copolymer preferably having a density of 0.86 to 0.91 grams per cubic centimeter ($g/cm^3$) and preferably made using a single site catalyst. A low melting temperature coupling agent of this invention e.g., MAH—grafted polyethylene, generally has a melting temperature of less than about 90° C., preferably less than about 80° C., and most preferably less than about 70° C. Formulations of this invention can include additional ethylenic resins such as, for example, ethylene ethyl acrylate (EEA) copolymer; ethylene vinyl acetate copolymers; and ethylene-alpha-olefin copolymers preferably with a density of less than about 0.910 $g/cm^3$. The density of 0.910 $g/cm^3$ is not applicable to EEA or EVA but only to PE. Polymers of this invention also generally will contain optional fillers such as alumina trihydrate (ATH), magnesium hydroxide ($Mg(OH)_2$) and calcium carbonate. Other such fillers will readily be suggested to one skilled in this art.

When particulate inorganic fillers are compounded with organic polymers, the interface between the polymers and the inorganic particles involves a complex interaction which can be related to a combination of both physical and chemical factors. These factors will affect the adhesion of the particles to the polymer, the dispersion of the particles which can lead to localized concentration gradient of the fillers, the coefficient of thermal expansion, the un-aged and aged physical properties such as tensile and elongation properties, and the retention in physical properties especially when aged at high temperatures in wet or humid environments. Properly selected coupling agents at an appropriate concentration can significantly improve a number of properties and more significantly retain them under heat aging tests and actual use of the products. The primary function of a good coupling agent is to provide a durable bond between two surfaces which otherwise poorly adhere to one another. Essentially a coupling agent acts as an adhesion promoter when used as an ingredient in the formulation. It helps to make the surface of the fillers more compatible and dispersible in the polymers. Without it the bond between fillers and the polymers would be weak and would not be able to maintain its integrity in testing and actual use conditions.

One factor which tends to weaken the bond between the fillers and the polymers is water. A good coupling agent will form bonds which are resistant to weakening by water.

The quality of the bond between the fillers and the polymer will be a function of several factors including the type/level of coupling, the chemical identity of the fillers and polymers, and the degree of filler dispersion. The two most common types of coupling agents are silane coupling agents and maleic anyhydride grafted polyolefin coupling agents.

Generally speaking, preferred compounds of this invention will have composition ranges as follows:

About 15 to about 25% by weight of an EEA (ethylene-ethyl acrylate) or EVA (ethylene vinyl acetate)

5 weight percent to about 20 weight percent polyolefin resin;

3 weight percent to about 10 weight percent low melting temperature MAH-grafted polyethylene, preferably VLDPE base resins having densities ranging from 0.86 to 0.91 made with the metallocene catalysts;

40 weight percent to about 65 weight percent filler.

Preferred compositions of this invention also can include:

1 to about 5 weight percent of a silicone smoke suppressant 0.1 to about 1 weight percent of a coating or processing aid, e.g., stearic acid

DETAILED DESCRIPTION OF THE INVENTION

Figure 1:
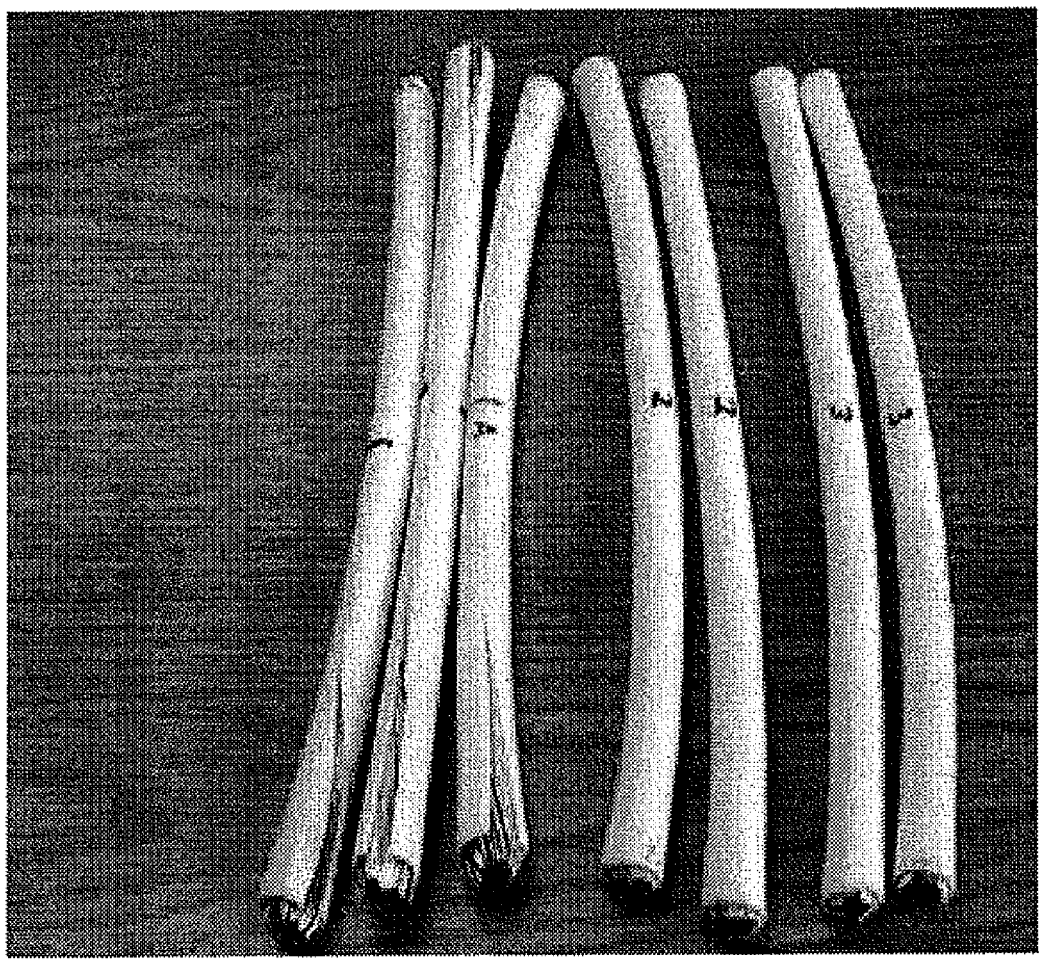
FIG. 1 shows cracked and non-cracked jackets.

The ethylenic resin or resins employed in the present invention as base resin are preferably selected from the group consisting of ethylene vinyl acetate copolymer (EVA), ethylene ethyl acrylate copolymer (EEA), and very low density ethylene alpha-olefin copolymers (VLDPE) EVA and EEA are copolymers. The EEA and EVA copolymers can be produced in a conventional high pressure process by copolymerizing ethylene with vinyl acetate or ethylene with ethyl acrylate using a free radical initiator such as an organic peroxide under reaction temperatures in the range of about 150 to about 350° C. and reaction pressure of about 100 to about 300 MPa. EVA and EEA are commercially available from Dow Chemical Company, E.I. duPont Company and others.

It is preferred that the EVA and EEA have melt flow rates in the range of about 0.5 to about 50 grams per 10 minutes (g/10 min). The comonomer content of the vinyl acetate or ethyl acrylate can be about 5 to about 40 weight percent, and is preferably about 10 to about 35 weight percent based on the weight of the polymer.

Very low density PE (VLDPE) is a copolymer of ethylene and an alpha-olefin such as propylene, 1-butene, 1-hexene, 4-methyl-1-pentene, 1-octene, 1-decene, and 1-dodecene. The VLDPE preferably is made with a single-site catalyst and has the following properties: a melt flow rate of about 0.5 to about 50 g/10 min (ASTM-1238 (190° C./2.16 Kg)) and a density of 0.86 to 0.91 g/cm$^3$ (ASTM D-792). VLDPE is commercially available from The Dow Chemical Company under the trade designations AFFINITY® and ENGAGE®. The ethylene/alpha-olefin copolymer, AFFINITY® resin is generally produced with a constrained geometry catalyst (a single-site catalyst) and contains from about 0.01 to about 3 long chain branches per 1000 total carbon atoms.

A coupling agent of the present invention is obtained by modification of ethylenic resins by a chemical compound containing an organo-functional group. An ethylenic resin is simply one wherein the primary monomer is ethylene. Examples of organo-functional group containing chemical compounds are unsaturated carboxylic acids such as fumaric acid, acrylic acid, maleic acid, crotonic acid, and citraconic acid; unsaturated aliphatic diacid anhydrides such as maleic anhydride, itaconic anhydride, citraconic anhydride, 5-norbornene-2,3-dicarboxylic anhydride, 4-methyl cyclohexene-1,2-dicarboxylic anhydride, and 4-cyclohexene-1,2-dicarboxylic anhydride; epoxy compounds such as glycidyl acrylate, glycidyl methacrylate, and allyl glycidyl ether; hydroxy compounds such as 2-hydroxyethyl acrylic acid, 2-hydroxyethyl methacrylic acid, and polyethylene glycol mono-acrylate; metal salts such as sodium acrylate, sodium methacrylate, and zinc acrylate; silane compounds such as vinyl tri-chloro silane, vinyl tri-ethoxy silane, vinyl tri-methoxy silane, and methacryloxy propyl tri-methoxy silane.

The ethylenic resins (e.g., PE resins), in unmodified form, can have a melt index in the range of about 0.1 to about 50 g/10 min and a density in the range of about 0.860 to 0.950 g/cm$^3$. They can be any ethylene/alpha-olefin copolymer produced by conventional methods using Ziegler-Natta catalyst systems, Phillips catalyst systems, or other transition metal catalyst systems. Thus, the copolymer can be a very low density polyethylene (VLDPE), a linear low density polyethylene (LLDPE), a medium density polyethylene (MDPE) having a density in the range of 0.926 to 0.940 g/cm$^3$, or a high density polyethylene (HDPE) having a density greater than 0.940 g/cm$^3$. These ethylenic resins can also be such resins as EVA, EEA, high pressure low density polyethylene (HP-LDPE) (HP-LDPE is a homopolymer), or ethylene/alpha-olefin copolymers produced by employing single site metallocene catalysts. These various ethylenic resins can be referred to generically herein as polyethylenes.

An amount of the above-mentioned organo-functional group containing chemical compound to be added to modify the ethylenic resin is preferably in the range of about 0.05 to about 10 weight percent based on the weight of the resin. Modification can be accomplished by, for example, solution, suspension, or melting methods. The solution method is effected by mixing an organo-functional group containing chemical, an ethylenic resin, a non-polar organic solvent and a free radical initiator such as an organic peroxide, and then heating the mixture to about 100 to about 160° C. to perform the modification reaction. Hexane, heptane, benzene, toluene, xylene, chlorobenzene and tetra-chloroethane are examples of non-polar solvents. 2,5-dimethyl-2,5-di(t-butyl peroxy) hexane, 2,5-dimethyl-2,5-di(t-butyl peroxy) hexyne-3, and benzoyl peroxide are examples of organic peroxides. In the suspension method, the ethylenic resin, the organo-functional group containing chemical compound are mixed with a polar solvent such as water and then a free radical initiator is added. The mixture is then heated to a temperature above 100° C. to obtain the modified ethylenic resin. In the melting method, the ethylenic resin, the organo-functional group containing chemical compound, and a free radical initiator are introduced into a melting-kneading machine such as an extruder and BANBURY® mixer to obtain the modified ethylenic resin.

Typical anhydride modifications can be described as follows: Grafting is accomplished by adding a solution of anhydride, an organic peroxide catalyst, and an organic solvent to polyethylene in particulate form. The organic peroxide catalyst is soluble in the organic solvent. Various organic solvents, which are inert to the reaction, can be used. Examples of useful organic solvents are acetone, methyl ethyl ketone, methyl propyl ketone, 3-pentanone, and other ketones. Other carrier solvents which allow solubilization of peroxide and anhydride, and which strip off well under appropriate devolatilization conditions may be used. Acetone is a preferred solvent because it acts as a stripping agent for residuals such as non-grafted anhydride or anhydride by-products. The anhydride solution can contain abut 10 to about 50 percent by weight anhydride; about 0.05 to about 5 percent by weight organic peroxide catalyst; and about 50 to about 90 percent by weight organic solvent based on the total weight of the solution. A preferred solution contains about 20 to about 40 percent anhydride; about 0.1 to about 2 percent peroxide; and about 60 to about 80 percent solvent.

The anhydride grafted polymer can contain about 0.05 to about 5 or 10 parts by weight of anhydride per 100 parts by weight of polymer and preferably contains about 0.1 to about 2 parts by weight of anhydride per 100 parts by weight of polymer.

Anhydride modification can also be accomplished by copolymerization, for example, by the copolymerization ethylene, ethyl acrylate, and malefic anhydride. The polymerization technique is conventional, and is similar to the polymerization of the underlying comonomers, i.e., ethylene and one or more alpha-olefins. Reference can be made to Maleic Anhydride, Trivedi et al, Polonium Press, New York, 1982, Chapter 3, section 3-2. This treatise also covers grafting.

As an inorganic flame-retardant preferably is employed in the present invention, the following materials are given as examples: Huntite, hydromagnesite, antimony trioxide, potassium hydroxide, calcium phosphate, zirconium oxide, titanium oxide, zinc oxide, magnesium oxide, magnesium carbonate, calcium carbonate, barium sulfate, barium borate, meta-barium borate, zinc borate, meta-zinc borate, aluminum anhydride, molybdenum disulfide, clay, red phosphorus, diatomite, kaolinite, montmorilonite, hydrotalcite, talc, silica, white carbon, celite, asbestos, and lithopone.

The preferred inorganic flame retardants are the hydrated inorganic flame retardant fillers, $Mg(OH)_2$ and alumina trihydrate (ATH). It is preferred that the filler primarily comprise ATH, with $Mg(OH)_2$, if present, being a minor constituent. Conventional off-the-shelf magnesium hydroxide and alumina trihydrate can be used.

The amount of filler used in the composition can be in the range of about 50 to about 250 parts by weight of hydrated filler per 100 parts by weight of the mixture of resins, and is preferably present in the range of about 100 to about 230 parts by weight of hydrated filler.

The hydrated filler can be surface treated (coated) with a saturated or unsaturated carboxylic acid having about 8 to about 24 carbon atoms and preferably about 12 to about 18 carbon atoms or a metal salt thereof, but coating is optional. Mixtures of these acids and/or salts can be used, if desired. Examples of suitable carboxylic acids are oleic, stearic, palmitic, isostearic, and lauric; of metals which can be used to form the salts of these acids are zinc, aluminum, calcium, magnesium, and barium; and of the salts themselves are magnesium stearate, zinc oleate, calcium palmitate, magnesium oleate, and aluminum stearate. The amount of acid or salt can be in the range of about 0.1 to about 5 parts of acid and/or salt per one hundred parts of metal hydrate and is preferably about 0.25 to about 3 parts per one hundred parts of metal hydrate. The surface treatment is described in U.S. Pat. No. 4,255,303. The acid or salt can be merely added to the composition in like amounts rather than using the surface treatment procedure, but this is not preferred.

The resin component of this invention can be combined with conventional additives provided that the particular additive chosen will not adversely affect the composition. The additives can be added to the resin composition prior to or during the mixing of the components, or prior to or during extrusion. The additives include antioxidants, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, fillers, flame retardant additives, crosslinking boosters and catalysts, and smoke suppressants. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis[methylene(3,5-di-tert-butyl-4-hydroxyhydrocinnamate)]-methane, bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-ditert-butylphenyl)phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of resin.

The silicone oil preferably used in the invention can be exemplified by the following formula: $R_3-Si-O(R_2-Si-O)_n-R_2-Si-O-R$ where in each R is independently a saturated or unsaturated alkyl group, an aryl group, or a saturated or unsaturated alkyl group, an aryl group, or a hydrogen atom and n=1 to 5000. Typical groups are methyl, ethyl, n-propyl, isopropyl, n-butyl, isobutyl, phenyl, or vinyl. The silicone oil can also be a glycidyl modified silicone oil, an amino modified silicone oil, a mercapto modified silicone oil, a polyether modified silicone oil, a carboxylic acid modified silicone oil, or a higher fatty acid modified silicone oil. The viscosity of the silicone oil can be in the range of about 0.65 to about 1,000,000 centistokes at 25° C., preferably in the range of about 5000 to about 100,000 centistokes, and most preferably in the range of about 10,000 to about 100,000 centistokes. The silicone oil component is used in an amount of about 1 to about 5% by weight in the formulation.

The various resins can be crosslinked in a conventional manner, if desired. Crosslinking is usually accomplished with an organic peroxide, examples of which are mentioned with respect to grafting. The amount of crosslinking agent used can be in the range of about 0.5 to about 4 parts by weight of organic peroxide for each 100 parts by weight of resin, and is preferably in the range of about 1 to about 3 parts by weight. Crosslinking can also be effected with irradiation or moisture, or in a mold, according to known techniques. Crosslinking temperatures can be in the range of about 150 to about 250° C. and are preferably in the range of about 170 to about 210° C.

The composition can also be blended and kneaded using a BANBURY® mixer, a HENSCHEL® mixer, a kneader, a multi-screw extruder, or continuous mixer to obtain a uniformly compounded composition.

The resin composition can be mixed and the cable coated with the resin composition can be prepared in various types of extruders. All types of single screw and twin screw extruders and polymer melt pumps and extrusion processes will generally be suitable in effecting the process of this invention as long as they are adapted for mixing or foaming. A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The length to diameter ratio of each barrel is generally in the range of about 15:1 to about 30:1.

The advantages of the invention lie in a producing crack resistant formulation coupled with, excellent flame and heat resistance, mechanical properties superior to conventional products, good moldability, good low temperature performance, good insulating properties, good processability and flexibility, and essentially no emission of harmful gases or corrosive smoke as would be incurred during combustion of systems with halogens. The crack-resistant formulation is suitable for use as general purpose low smoke zero halogen jacket for a variety of cables and insulation for low voltages cable.

As noted, a cable to which this invention is generally applicable comprises one or more electrical conductors or communications media, or a core of two or more electrical conductors or communications media, each electrical conductor, communications medium, or core being surrounded by an insulating composition. The electrical conductors are generally copper and the communications media are generally fiber optics made of glass fibers. The term "cable" includes wires and armored cables as noted above.

For purposes of United States patent practice, the patents, patent applications and other publications mentioned in this specification are incorporated by reference herein.

The invention is illustrated by the following examples.

Examples

Exemplary formulations were prepared using alternative polyethylene coupling agents with a density of 0.86-0.910 g/cm³. Formulation 1 (Table 1) contains a high melting point coupling agent functional polymer (117° C. melting point). Formulation 2 (Table 1) contains a low melting point coupling agent functional polymer (63° C. melting point). Both were prepared using Brabender® mixer under the indicated conditions. Formulation 3 (Table 3) used maleic anhydride modified polyethylene (Coupling Agent (3)) commercially available from du Pont de Nemours, Inc. Also according to the product literature from the suppliers of the MAH coupling agents, the coupling agent used in Formulation 1 is formulated with a Ziegler Natta catalyzed (multi-site catalyst) VLDPE with a density of less than 0.900 g/cm³ while the coupling agents used in Formulations 2 and 3 are formulated with base resins made with single site catalysts.

The following conditions were used:

Batch Size: 350 g; Start Brabender™ at 20 revolutions per minute (rpm) with all the components in the bowl. Once the melt temperature reached 132° C., the mixer rpm was increased to 50 and kept under this condition for 10 minutes before discharging the batch. The maximum melt temperature in the mixer bowl was 155° C. The discharged batch was roll milled and pelletized as shown.

The pellets were next extruded onto wire in a lab Brabender wire line on 14 AWG 7 strands copper conductor with 30 and 45 mil wall. The wires were wrapped around a single diameter mandrel (same diameter as the wire) for 7 turns. The wrapped wires were next heat aged in ovens at 100° C. where the cracking was found to be much more predominant for the Formulation 1 extruded wire. The wires were also evaluated at 121° C. and 150° C. Formulation 2 with a low melting point maleic anhydride coupling agent (2) was found to be more resistant to cracking at 100° C. heat aging. Formulation 1 cracked to visual inspection on average within the first 0.2 days vs. zero cracking after 10 days for Formulation 2. Both formulations were checked for physical properties (tensile/elongation), flame, smoke and were found to be essentially equivalent.

Resin A is an ethylene-ethyl acrylate, as described above, which is commercially available from The Dow Chemical Company.

Resin B is an ethylene-octene copolymer which is also commercially available from The Dow Chemical Company.

Coupling agents (1), (2), (3) are maleic anhydride grafted polyethylene commercially available from Dow Chemical Company ((1) and (2)) (under the trade designations Amplify® GR-208 and Amplify® GR-216, respectively) and E. I. du Pont Chemical Company (3).

Stearic acid is an 18 carbon fatty acid processing aid and filler surface treatment;

The antioxidant is a phenolic-based antioxidant commercially available from Ciba Specialty Chemicals under the trade designation Irganox 1010.

TABLE 1

Formulations

| Raw Materials | Formulation 1 (wt %) | Formulation 2 (wt %) |
|---|---|---|
| Resin A | 20.45 | 20.45 |
| Resin B | 10.5 | 10.5 |
| Coupling Agent Functional Polymer (1) | 7 | |
| Coupling Agent Functional Polymer (2) | | 7 |
| Stearic Acid | 0.35 | 0.35 |
| Silicone Oil | 1.5 | 1.5 |
| Antioxidant | 0.2 | 0.2 |
| ATH | 50 | 50 |
| MGH | 5 | 5 |
| Calcium Carbonate | 5 | 5 |
| Total | 100 | 100 |

The same dramatic and unexpected improvement in cracking performance (i.e., crack resistance) was observed when a different source of calcium carbonate was used in Formulation #2 without any significant effect on other properties.

TABLE 2

Measured Properties of Formulations 1 and 2

| Physical Properties | Formulation 1 | Formulation 2 |
|---|---|---|
| Tensile Un-aged, psi | 1725 | 1699 |
| Elongation Un-aged, % | 210 | 219 |
| Tensile Retained, % 121 C./7 days | 103 | 108 |
| Elongation Retained, % 121 C./7 days | 81 | 87 |
| Trouser Tear, lb/in | 43 | 40 |
| UL-94 | V1 | V1 |
| Smoke ASTM E662 Non Flaming | 114 | 104 |
| Smoke ASTM E662 Flaming | 23 | 28 |

Formulation 1 exhibited substantially less crack resistance than Formulation 2.

TABLE 3

Formulation 3

| Raw Material | Formulation 3 (wt %) |
|---|---|
| Resin A | 20.45 |
| Resin B | 10.5 |
| Coupling Agent Functional Polymer (3) | 7 |
| Stearic Acid | 0.35 |
| Silicone oil | 1.5 |
| Antioxidant | 0.2 |
| ATH | 50 |
| MGH | 5 |
| Calcium Carbonate | 5 |
| Total | 100 |

TABLE 4

Measured Properties of Formulation 3

| Physical Properties | Formulation 3 |
|---|---|
| Tensile Un-aged, psi | 1921 |
| Elongation Un-aged, % | 267 |
| Tensile Retained, % 121 C./7 days | 82 |
| Elongation Retained, % 121 C./7 days | 83 |
| Trouser Tear, lb/in | 47 |

Example 3 is given as an additional example. Coupling agent functional polymer (3) also provided a good balance of physical properties and cracking performance. It further shows that the lower melting point temperature of the coupling agent used in the formulation helps eliminate the cracking problem. A number of properties of the filler coupling agents cited in the examples are also listed in Table 5 below.

TABLE 5

Properties of Filler Coupling Agents

| | Melt Index | Density | MAH Comonomer Graft Level | Melting Point, °C. | Cracking |
|---|---|---|---|---|---|
| Coupling Agent (1) | 3.3 | 0.8985 | Medium | 117 | Yes |
| Coupling Agent (2) | 1.25 | 0.870 | High | 63 | No |
| Coupling Agent (3) | 1.6 | 0.870 | Medium | 48 | No |

The coupling agents used in the above examples are modified polymers that have been functionalized (typically by maleic anhydride grafting) to improve adhesion of the fillers to the polymers used in the formulation. The level of maleic anhydride is adjusted to give a moderate level (Medium) or a "High" level of grafting in the formulation. The exact level of maleic anhydride used in the coupling agents has not been disclosed by the suppliers. From an adhesion of fillers to polymers standpoint, a higher level of maleic anhydride comonomer graft level will help improve bonding. These characterizations of MAH level are those of the MAH suppliers.

In the cable aging test as per BS60811-3-1, three cable samples of about 30 to about 40 cm are cut from the reels. The cable samples are kept suspended in an oven at 100 C for seven days by ensuring that the jacket or cable is not in direct contact with any objects. The cracks on the jacket are checked with the naked eyes initially every hour up to 6 hours and daily afterwards. Based on the results to date, cracking if any would occur within one to two days of testing. A picture of the cracked and non-cracked cables is shown at FIG. 1.

Although the invention has been described with certain detail through the preceding specific embodiments, this detail is for the primary purpose of illustration. Many variations and modifications can be made by one skilled in the art without departing from the spirit and scope of the invention as described in the following claims.

What is claimed is:

1. A halogen-free coating composition comprising:
   A. At least one of ethylene ethyl acrylate (EEA) or ethylene vinyl acetate (EVA) copolymer;
   B. An alpha-olefin copolymer;
   C. A maleic anhydride (MAH) grafted, very low density polyethylene (VLDPE) (1) made with a single-site catalyst, (2) containing 0.5 to 10 weight percent (wt %) units derived from MAH, and (3) having a melting point temperature of less than 90° C.;
   D. A flame retardant inorganic filler;
   E. An optional smoke suppressant; and
   F. An optional processing aid.

2. The coating composition of claim 1 in which the at least one of EEA or EVA comprises 15 to 25 percent by weight (wt %) of the composition, the alpha-olefin copolymer comprises 5 to 20 wt % of the composition, the MAH-grafted VLDPE comprises 3 to 10 wt % of the composition, and the flame retardant inorganic filler comprises 40 to 65 wt % of the composition.

3. The coating composition of claim 2 in which the flame retardant inorganic filler is at least one of alumina trihydrate and magnesium hydroxide.

4. The coating composition of claim 3 in which the smoke suppressant is a silicone oil and is present in an amount of 1 to 5 wt % of the composition.

5. The coating composition of claim 4 in which the processing aid is stearic acid and is present in an amount of 0.1 to 5 wt % of the composition.

6. The coating composition of claim 5 in which the alpha-olefin polymer is selected a polyethylene with a density of 0.91 g/cm$^3$ or less.

7. The coating composition of claim 6 in which the EEA comprises between 5 and 40 wt % units derived from ethyl acrylate and the EVA comprises between 5 and 40 wt % units derived from vinyl acetate.

8. The coating composition of claim 7 further comprising at least one additive selected from the group consisting of antioxidants, ultraviolet absorbers or stabilizers, antistatic agents, pigments, dyes, nucleating agents, resistivity modifiers, slip agents, plasticizers, lubricants, viscosity control agents, tackifiers, anti-blocking agents, surfactants, extender oils, metal deactivators, voltage stabilizers, crosslinking agents, and crosslinking boosters and catalysts.

9. A cable protective outer jacket comprising the coating composition of claim 1.

10. A cable comprising the outer jacket of claim 9.

* * * * *